June 23, 1925.
F. G. MATSON
DEVICE FOR MOLDING AND BAKING HOLLOW EDIBLE ARTICLES
Filed Jan. 9, 1924    3 Sheets-Sheet 1
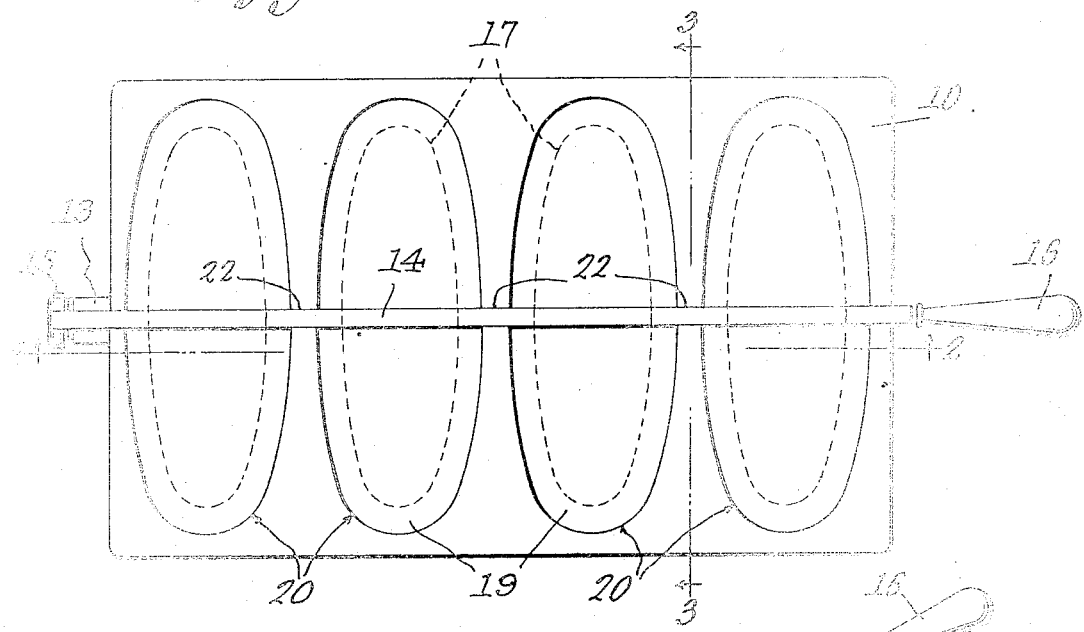
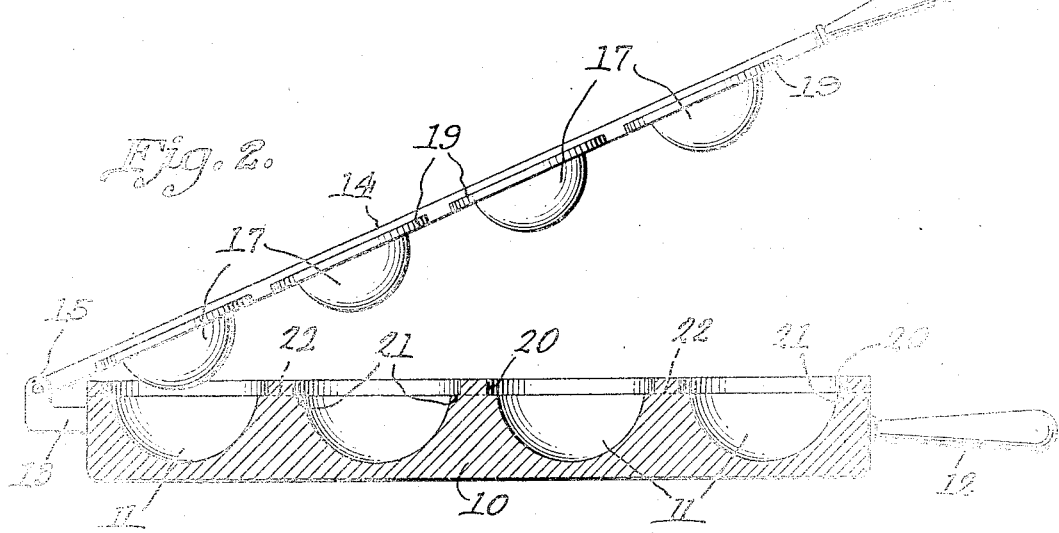
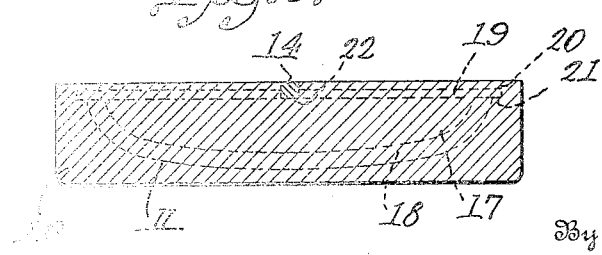
Inventor
Francis G. Matson June 23, 1925.  1,543,221
F. G. MATSON
DEVICE FOR MOLDING AND BAKING HOLLOW EDIBLE ARTICLES
Filed Jan. 9, 1924  3 Sheets-Sheet 2
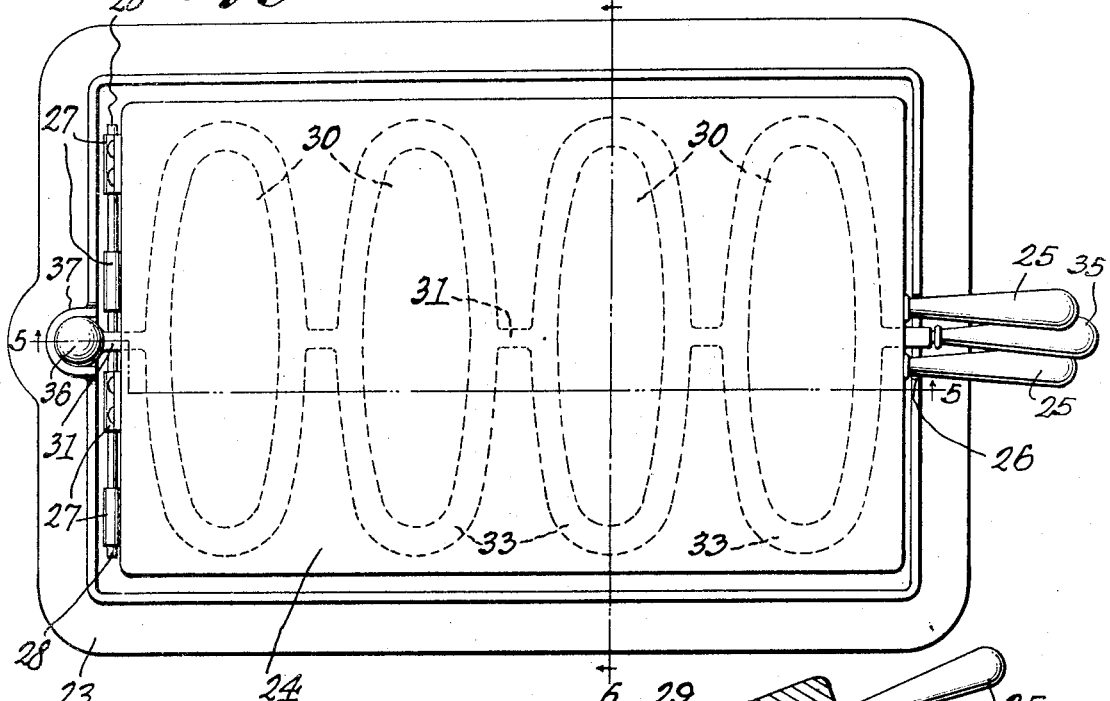
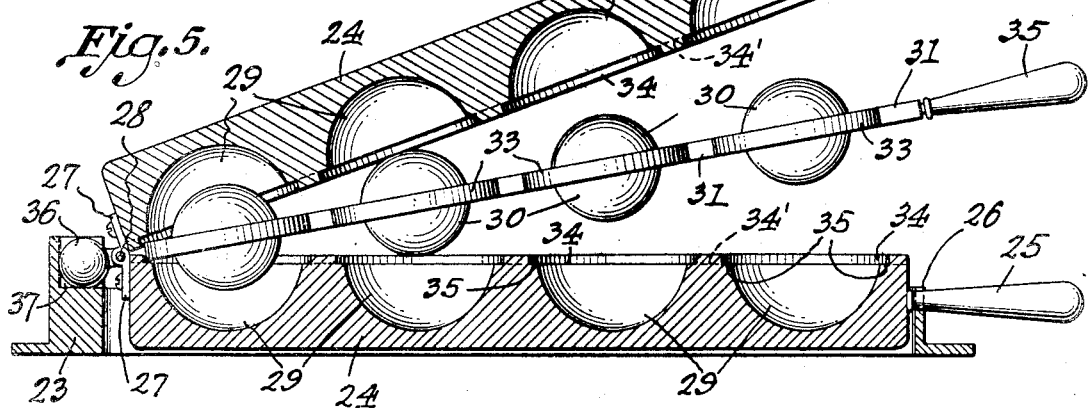

June 23, 1925.  1,543,221
F. G. MATSON
DEVICE FOR MOLDING AND BAKING HOLLOW EDIBLE ARTICLES
Filed Jan. 9, 1924  3 Sheets-Sheet 3
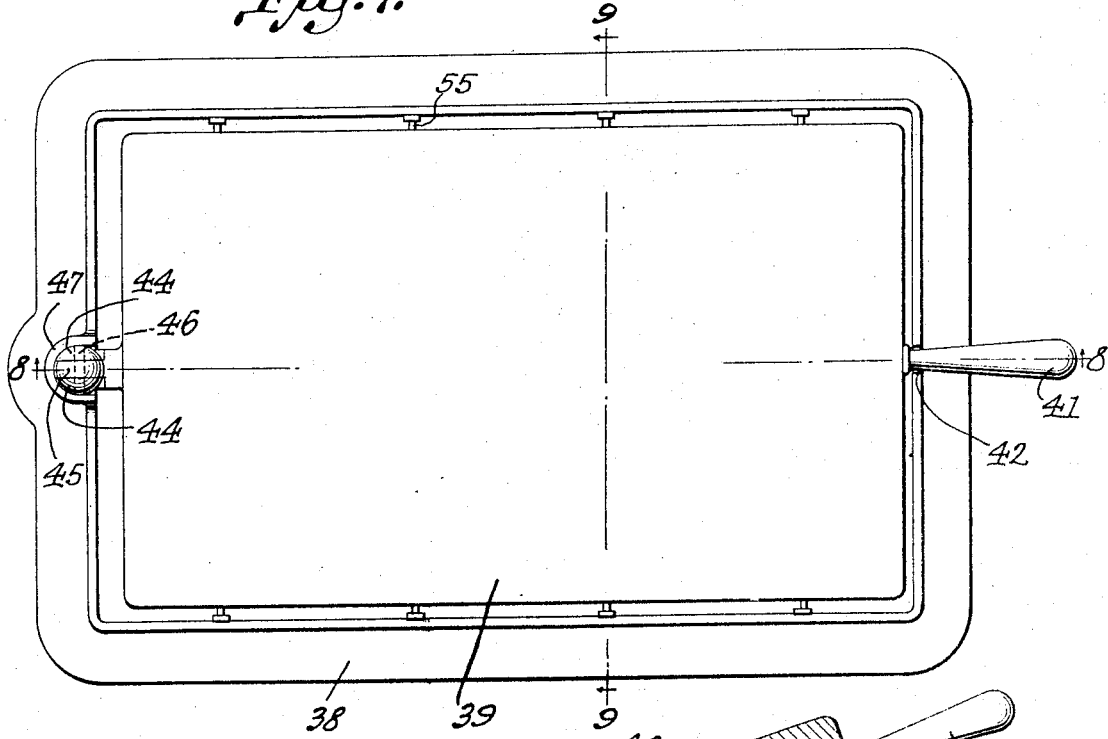
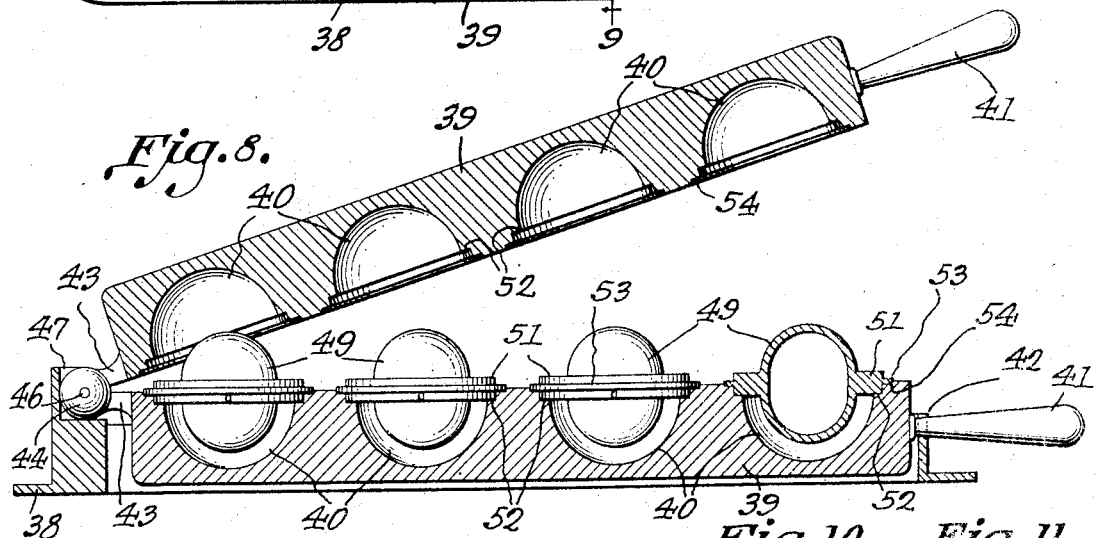
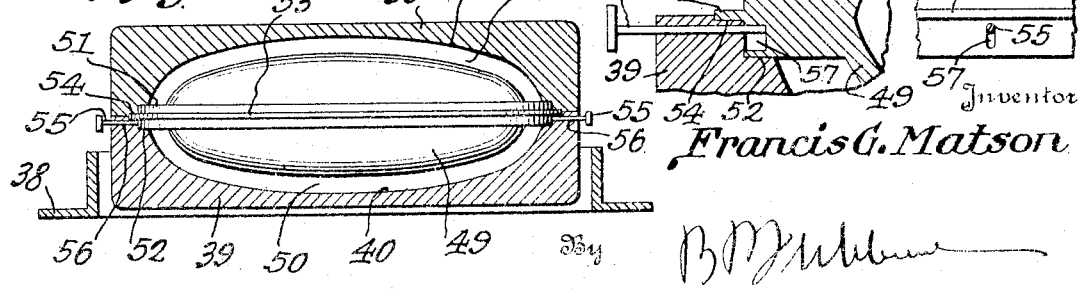
Inventor
Francis G. Matson Patented June 23, 1925.

1,543,221

UNITED STATES PATENT OFFICE.

FRANCIS G. MATSON, OF WASHINGTON, DISTRICT OF COLUMBIA.

DEVICE FOR MOLDING AND BAKING HOLLOW EDIBLE ARTICLES.

Application filed January 9, 1924. Serial No. 685,265.

*To all whom it may concern:*

Be it known that I, FRANCIS G. MATSON, a citizen of the United States, residing at Washington, District of Columbia, have invented certain new and useful Improvements in Devices for Molding and Baking Hollow Edible Articles, of which the following is a specification.

My invention relates to a device or iron for molding and cooking hollow edible casings or casing sections, adapted to be partly or wholly filled with an edible material, of any desired character.

An important object of the invention is to provide a device or iron of the above mentioned character, which is of simplified construction, may be operated quickly and conveniently, and will properly mold and bake hollow edible casings or casing sections.

A further object of the invention is to provide a device or iron of the above mentioned character, designed to bake sets of hollow edible casing sections, which are adapted to be assembled for forming enclosing edible casing sections.

Other objects and advantages of the invention will be apparent during the course of the following description.

In the accompanying drawings, forming a part of this specification, and in which like numerals are employed to designate like parts throughout the same, Figure 1 is a plan view of a cooking device or iron embodying my invention, Figure 2 is a longitudinal section taken on line 2—2 of Figure 1, Figure 3 is a transverse section taken on line 3—3 of Figure 1, Figure 4 is a plan view of a device embodying a second form of my invention, Figure 5 is a longitudinal section taken on line 5—5 of Figure 4, Figure 6 is a transverse section taken on line 6—6 of Figure 4, Figure 7 is a plan view of a device embodying a third form of my invention, Figure 8 is a longitudinal section taken on line 8—8 of Figure 7, Figure 9 is a transverse section taken on line 9—9 of Figure 7, and, Figures 10 and 11 are enlarged detail views of the locking means for the double male mold elements.

In the drawings, wherein for the purpose of illustration are shown preferred embodiments of my invention, attention being called first to Figures 1 to 3 inclusive, the numeral 10 designates a female mold member, preferably of cast iron, and provided upon its upper surface with recesses or pockets 11, for the reception of the dough or batter. These recesses or pockets are shown as generally elliptical, but of course they may be varied to produce a hollow cooked product of the desired shape or configuration. The mold member 10 is provided at its rear end with a handle 12 and at its forward end with a bracket 13, rigidly secured thereto. This bracket is forked for the reception of the forward end of a rod 14, hinged thereto by means of a pin 15. This rod is provided at its rear end with a handle 16.

Rigidly secured to the rod 14, preferably cast integral therewith, are male mold elements 17, shown as generally elliptical, for proper insertion within the recesses 11, providing a space 18 therein, for holding the dough or batter. These male mold elements extend transversely of the rod 14 and are provided at their tops with marginal flanges 19, projecting laterally therebeyond. These flanges are adapted for insertion within elliptical recesses 20, and to rest upon shoulders 21, thereby overlapping and completely closing the space 18, receiving the dough or batter. The rod 14 passes into notches or openings 22, formed in the mold member 10, between the recesses 11, as shown. This forms an interlocked engagement between the rod and mold member 10, positively preventing the rod from partaking of improper lateral movement, whereby the male mold elements 17 are locked in the centered position within the recesses 11.

In the use of the cooking device, the female mold member 10 is placed upon a stove or the like, and a proper amount of batter or dough is introduced into the recesses or pockets 11. The rod 14 is then quickly lowered into engagement with the mold member, and the male mold elements 15 enter the recesses 11. The dough or batter is thereby shaped or molded within the cavity or passage 18, and subsequently baked in this molded shape. Two of the baked dough products may be partly or wholly filled with an edible material, such as a sausage, jelly or the like, then assembled into an enclosing casing, and held together by any suitable means as by an edible cement, such as a flour paste.

Attention is now called to Figures 4 to 6 inclusive, wherein is shown a modification of the invention. In these figures the numeral 23 designates a frame, shown as rectangular for the purpose of illustration. This frame is adapted to be placed upon a stove or the like and serves to support the companion female mold members 24. The mold members 24 are provided at their rear ends with handles 25, adapted to rest in a notch or opening 26 in the frame 23. At their forward ends, the mold members 24 have hinge leaves 27, rigidly secured thereto. The knuckles of these hinge leaves receive a pin 28, which serves to pivotally connect the hinge leaves and the mold members 24 carried thereby. The mold members 24 have recesses or pockets 29, formed upon the inner faces thereof. These pockets are shown as generally elliptical, but of course their shape and configuration may be changed, depending upon the character of the molded product to be produced.

The numeral 30 designates double hollow male mold elements, preferably iron castings, and preferably integral with a rod 31. These male mold elements are adapted to enter the pockets or recesses 29, in the upper and lower mold members 24, providing spaces 32, for the dough or batter. The male mold elements 30 have marginal flanges 33, projecting laterally therebeyond, and adapted to enter recesses 34, and rest upon shoulders 35. These flanges extend across the chambers or spaces 32, completely covering the same, and separate the space 32 in the upper mold member 24 from the space 32 in the lower mold member, as clearly illustrated in Figure 6. The portions of the rod 31 between the male mold elements 30 is adapted to enter notches or openings 34, formed in the inner faces of the mold members 24, thereby locking the rod and these mold members against lateral displacement.

The rod 31 is provided at its rear end with a handle 35, rigidly secured thereto. At its forward end, the rod 31 is provided with a ball 36, integral therewith, to enter a socket 37 formed in the frame 23. The pin 28 is rigidly attached to the forward end of the rod 31, and preferably passes through a transverse opening formed therein.

In the use of this form of the invention, the handle 35 and the handle 25 of the upper mold member 24 may be grasped by the operator and raised, whereby the recesses or pockets 29 in the lower mold member will be uncovered. The dough or batter will be now introduced into these recesses, and the handle 35 lowered to bring the lower portions of the double mold elements 30 into the lower recesses 29. All elements of the device being now in the closed position, the three handles may be grasped by the operator and both mold members 24 elevated and turned upon their longitudinal axes, about the ball 36. The mold members are therefore inverted and the filled mold member 24 is now in the upper position. This filled mold member, with the male mold elements 30 within the recesses 29, is now raised, and the dough is introduced into the recesses 29 in the lower mold member 24, subsequent to which the upper member 29 and elements 30 are lowered to the closed position. The dough or batter will now be molded into the proper shape within the space 32, and baked therein, as is obvious.

In Figures 7 to 11 inclusive, I have shown a third form of the invention, wherein the numeral 38 designates a preferably rectangular frame, to be arranged upon a stove or the like.

Mounted within this frame are companion female mold members 39, preferably in the form of iron castings, having recesses or pockets 40 formed upon the inner faces thereof. These recesses or pockets are shown in a generally elliptical shape, although this may be varied, as may be desired. At their rear ends, these mold members 39 are equipped with handles 41, adapted to enter an opening or notch 42 in the frame 30. At their forward ends, the mold members 39 are provided with shanks 43, integral therewith. One shank is provided with a pair of spaced curved knuckles 44, receiving a curved knuckle 45, therebetween, carried by the other shank 43. These knuckles are pivotally connected by means of a pin 46. The knuckles 44 and 45 form a ball, rotatably mounted within a spherical socket 47, formed upon the frame 48. It is thus seen that the two handles 41 may be grasped by the operator, and the mold members 39 raised and turned upon their longitudinal axes, so that the device may be inverted.

The numeral 49 designates double male mold elements, preferably holow iron castings, which are generally elliptical, to correspond in shape with the recesses 40. The upper and lower portions of each mold element 49 is adapted for insertion within the pair of recesses 40, formed in the upper and lower mold members 39, providing recesses 50, for the reception of the dough or batter. Each mold element 49 is provided with a marginal flange 51, preferably integral therewith, which is adapted to enter grooves or notches 52, formed in the inner face of the companion mold members 39. These flanges cover the recesses or spaces 50, and separate the recesses in each pair. The flanges 51 have outwardly projecting flanges 53, entering outer notches 54.

It is preferred that means be provided to lock the double mold elements in the recesses of the lower mold member 39, prior to inverting the device, in order that there may be no tendency for these mold elements to drop out of the recesses. To accomplish this, I provide sliding bolts or locking elements 55, arranged within openings 56, and having their inner ends adapted to enter openings 57, formed in the flanges 51. It is thus seen that after the mold elements 49 are placed within the recesses 40 in the lower mold member 39, the pins 55 are moved inwardly, and hence the mold elements are locked in these recesses.

The dough is introduced into the recesses 40, in the lower mold member, and the mold elements 49 placed therein, as is obvious. The device is then inverted, and the dough introduced into the lower mold member and the companion mold members brought to the closed position. The dough is then baked.

In view of the description of the several forms of the invention, it is obvious that I have provided means which is capable of molding and baking dough or batter into hollow casing members, of a selected shape or configuration. These casing members may be assembled, for holding therein an edible filling of any suitable material, such as sausage, jelly, or the like.

It is to be understood that the forms of my invention herewith shown and described, are to be taken as preferred examples of the same, and that various changes in the shape, size, and arrangement of parts, may be resorted to, without departing from the spirit of my invention, or the scope of the subjoined claims.

Having thus described my invention, what I claim is:

1. A device for molding and baking hollow edible articles, comprising a pair of companion female mold members having recesses formed upon their inner faces, said mold members having cut away portions surrounding the recesses and notches between the recesses, a plurality of double male mold elements to enter the recesses in the mold members, a rod carrying the double male mold elements and adapted for insertion within the notches in said mold elements, flanges formed upon the male mold elements to enter the cut away portions, and means to hinge the female mold members together.

2. A device for molding and baking hollow edible articles, comprising a pair of companion female mold members having recesses upon their inner faces, said members having cut away portions surrounding the recesses and notches between the recesses, a rod arranged between the mold members and adapted to enter said notches, a ball secured to the forward end of the rod, a frame having a socket to receive the ball, handles secured to the mold members and to the rod at their rear ends, a transverse pin carried by the forward end of the rod, hinge leaves secured to the forward ends of the mold members and engaging the pin, and double male mold elements carried by the rod for coaction with the recesses and having surrounding flanges to enter said cut away portion.

In testimony whereof I affix my signature.

FRANCIS G. MATSON.